March 27, 1951     L. T. JACKSON     2,546,751
SAFETY MEANS FOR HYDRAULIC BRAKES
Filed Nov. 22, 1948     2 Sheets-Sheet 1

Lloyd T. Jackson
INVENTOR.

BY Clarence A. O'Brien
and Harvey B. Jackson
Attorneys

March 27, 1951 L. T. JACKSON 2,546,751
SAFETY MEANS FOR HYDRAULIC BRAKES
Filed Nov. 22, 1948 2 Sheets-Sheet 2
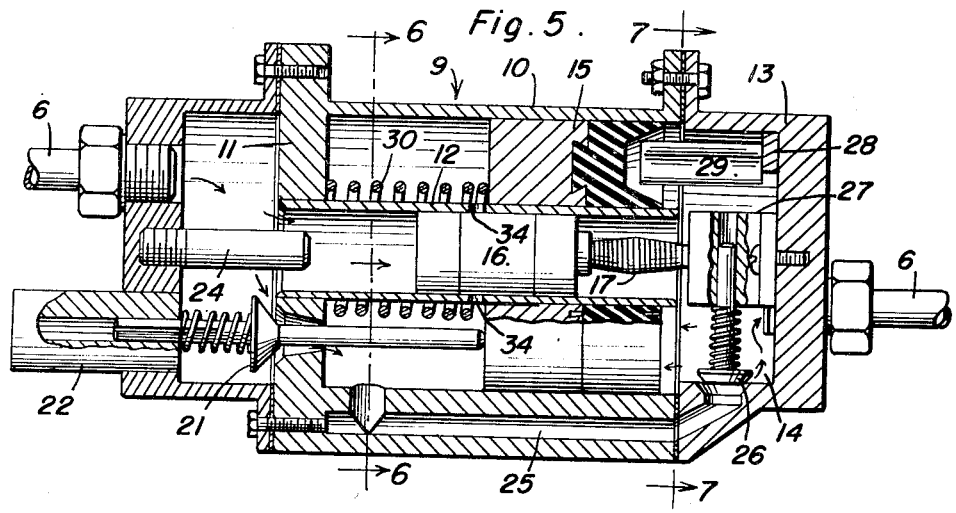
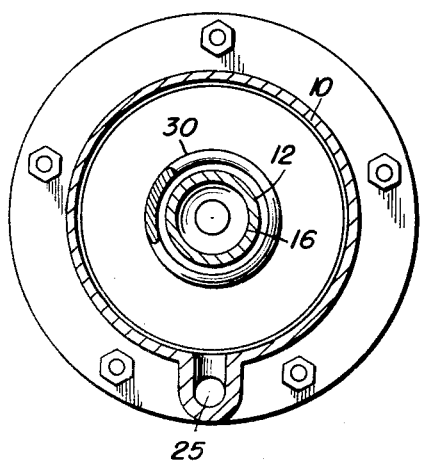 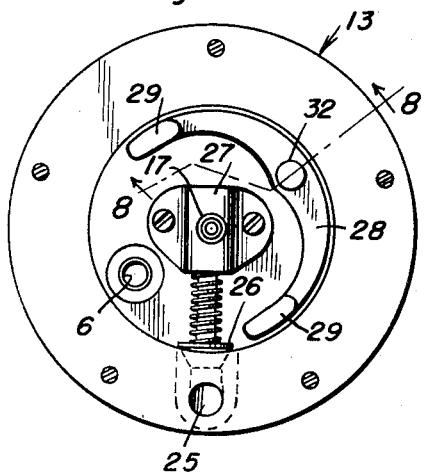
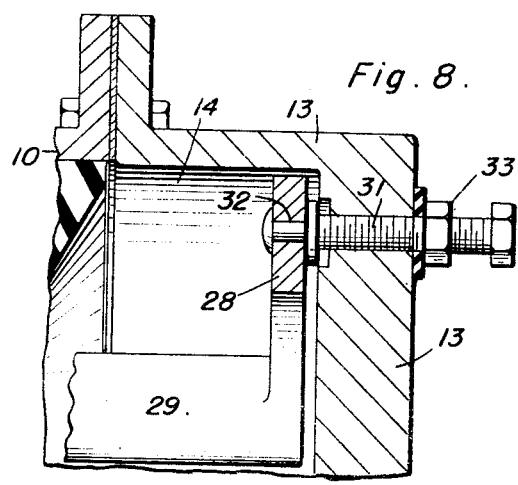
Lloyd T. Jackson
INVENTOR.

Patented Mar. 27, 1951

2,546,751

UNITED STATES PATENT OFFICE 2,546,751

SAFETY MEANS FOR HYDRAULIC BRAKES

Lloyd T. Jackson, Millboro, Va., assignor of thirty-three and one-third per cent to Herman H. Greenberg, Detroit, Mich.

Application November 22, 1948, Serial No. 61,478

5 Claims. (Cl. 303—84)

My invention relates to hydraulic four wheel brakes for automobiles, and more particularly to safety valve means for use in connection with a hydraulic four wheel brake system.

In any hydraulic installation where a number of devices are operated from a single pressure source, by means of individual lines or conduits running from the pressure source to the individual devices, it is desirable to provide some means whereby in the event of a rupture in one of the individual lines, all of the fluid which transmits the pressure will not be lost through that rupture, thus rendering the other devices inoperative. In particular, this is essential in four wheel brake installations, for if a rupture occurs in the line leading to one brake, unless some such safety means is provided, the entire complement of brakes is rendered inoperative, and there will most probably result a serious accident.

It is the object of my invention, therefore, to provide a safety means interposed between the pressure source and the operating device, by means of which pressure is transmitted from the pressure source to the operating device, such as the individual brake, so arranged that if a rupture occurs beyond the safety device, that line only will be put out of operation, and the pressure will be retained to permit operation of the other brakes, so that the car may be stopped thereby.

It is a further object, in connection with such a device as has been indicated, to provide a novel means whereby, following a rupture, the brake may be repaired and communication re-established between the pressure source and the brake, and the safety device put in condition for further normal operation, without the necessity of opening, adjusting, or doing anything to the safety device. In other words, it is my object to provide a safety device, the normal operation of which, following a rupture, is automatically resumed when normal pressure and fluid conditions are resumed.

A still further object is the provision of a device of the character described which is simple in construction and reliable in operation, and which is constructed of a small number of parts.

The exact nature of the present invention, as well as other objects and features thereof, will become apparent from the following description when considered in connection with the accompanying drawings, in which:

Figure 5 is a view similar to Figure 2 showing the parts of the device in the positions they assume when pressure is applied to cause application of the brakes;

Figure 6 is a transverse section taken on line 6—6 of Figure 5;

Figure 7 is a transverse section taken on line 7—7 of Figure 5;

Figure 8 is an enlarged fragmentary section taken on line 8—8 of Figure 7.

Figure 1:
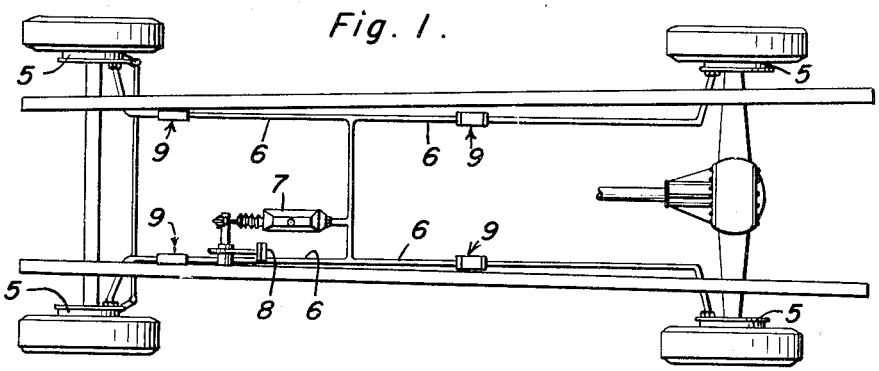
Figure 1 is a somewhat diagrammatic plan view showing the application of the invention to a four wheel hydraulic brake system.

The numerals 5 on the drawings denote hydraulic brakes having the usual cylinder and piston assemblies and other features well known in the art. Leading to these assemblies are the usual pressure lines 6 operatively connected with a master cylinder 7 whose piston is operated by the usual foot pedal 8. Introduced into each pressure line 6 at any desired point is one of the improved safety devices 9.

All of the safety devices 9 are of identical construction and hence a specific description of one will suffice. I employ a main or outer cylinder 10 which is closed at one end by a wall 11 and which is open at the other end. Supported by the wall 11 and disposed axially of the outer cylinder 10 is an inner cylinder 12 which is open at both ends. Applied to the open end of cylinder 10 is a cap member 13 forming an outlet chamber 14 therein which is in constant communication with the open ends of the cylinders 10 and 12. An annular piston 15 is slidably fitted on the inner cylinder 12 and within the outer cylinder 10, and reciprocable in the inner cylinder 12 is a piston 16 which is normally yieldingly urged away from the chamber 14 by means of a helical compression spring 17 which increases in diameter from its ends to its center to prevent buckling and permit close compression of the convolutions thereof. A second cap member 18 is secured to the closed end of cylinder 10 and forms an inlet chamber 19 in constant communication with the adjacent end of the inner cylinder 12. The wall 11 is provided with an opening 20 which affords communication between the inner end of cylinder 10 and the inlet chamber 19, and the opening 20 is normally closed by a spring seated valve 21 having a stem slidably engaged in a tubular guide 22 carried by the cap 18. Valve 21 seats forwardly or in the direction of movement of the fluid in the brake system when the brakes are applied, and it has a rigid pin 23 that projects into cylinder 10 in proximity to piston 15. Inward movement of the piston 16, or movement thereof toward the chamber 19 is limited by a stop pin 24 carried by the cap member 18. The wall of cylinder 10 has a bypass passage 25 providing communication between the inner end of cylinder 10 and the chamber 14 of cap member 13, and the end of passage 25 which opens into the chamber 14 is controlled by a spring seated check valve 26 that seats in a direction opposing the flow of fluid in the brake system when the brakes are applied. Valve 26 has a stem slidable in a guide member 27 carried by the cap member 13 within the chamber 14. The device 9 is interposed in the line 6 so that the pressure-supplying portion of the latter leads from the master cylinder 7 to the cap member 18 in communication with chamber 19, and so that the pressure-transmitting portion of said line extends from the cap member 13 in communication with the outlet chamber 14 to the associated brake 5.

Movable in the chamber 14 longitudinally of the device 9 is an arcuate stop member 28 which has terminal portions 29 that extend into the open end of cylinder 10 and limit the movement of piston 15 toward the outlet chamber 14. The piston 15 is urged in this direction by means of a helical compression spring 30 disposed about the inner cylinder 12 and interposed between the wall 11 and said piston 15. The movement of piston 15 under the influence of spring 30 is adjustably limited by adjustment of the stop member 28 longitudinally of the device, and this adjustment is effected by means of a screw 31 adjustably threaded through the cap member 13 and swivelled at its inner end in the stop member 28 as shown at 32 in Figure 8. The adjustment of screw 31 may be secured by a lock nut 33 threaded thereon outside the cap member 13. By adjusting stop member 28 inwardly until piston 15 opens valve 21, air may be bled from the brake system in the usual way because fluid may then freely pass through the device when the brake pedal is depressed.

Figure 2:
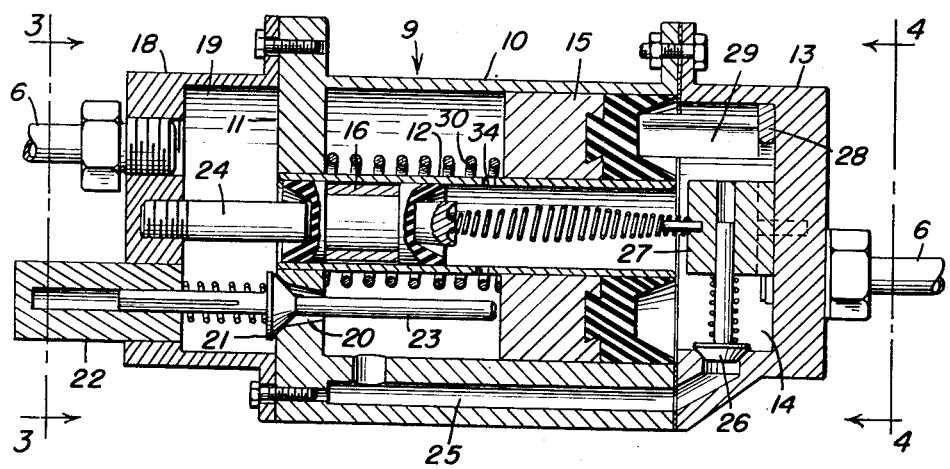
Figure 2 is an enlarged central longitudinal sectional view through one of the safety valve devices with the parts thereof in normal positions.
Figure 3:
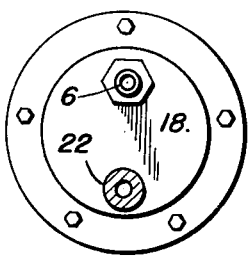
Figure 3 is a sectional view drawn on a reduced scale, taken on line 3—3 of Figure 2.
Figure 4:
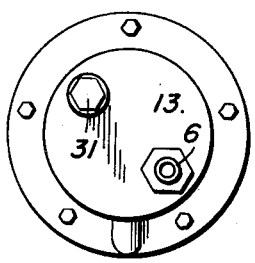
Figure 4 is a sectional view drawn on a reduced scale and taken on line 4—4 of Figure 2.

When the pedal 8 is depressed, fluid is forced from the master cylinder 7 into the line 6, such fluid passing into the inlet chamber 19 of each device 9. If there is no leak in the line 6 between the device 9 and the associated brake 5, piston 16 is forced against the action of spring 17 and fluid trapped in the line between the device 9 and the associated brake is placed under pressure to apply the brake. This builds up a pressure in the chamber 14 and causes movement of the piston 1 against the action of spring 30, thereby unseating valve 21 and permitting additional fluid to pass from the inlet chamber 19 to the brake by way of bypass passage 25 and chamber 14. However, should a break occur in the line between the device 9 and the associated brake 5, the movement of piston 16 will not build up pressure in the outlet chamber 14 sufficiently to cause movement of piston 15, and valve 21 will remain closed, thereby preventing passage of fluid from inlet chamber 19 to the brake by way of bypass passage 25 and chamber 14. In this way, loss of fluid from the ruptured line between the device 9 and its associated brake 5 is prevented and, although that particular brake is not applied, the other brakes will be operated so as to control the travel of the automobile until the particular break in the line 6 leading to the first named brake has been fixed or repaired. When pedal 8 is released, the springs 17 and 30 return the pistons 16 and 15 to the normal positions thereof shown in Figure 2, but valve 26 prevents flow of fluid from the portion of the line between the device 9 and the brake to the portion of said line between the device 9 and the master cylinder, thereby trapping fluid to cause application of the brake as soon as the piston 16 is forced toward the outlet chamber 14 when the pedal 8 is again depressed.

The cylinder 12 has ports 34 arranged to be uncovered by the pistons 15 and 16 when they are returned to their normal positions by the springs 30 and 17, thereby permitting passage of fluid behind the piston 15 from the pressure transmitting portion of conduit 6 and cylinder 12 and preventing pressure from building up in the wheel cylinder from repeated depression of the brake pedal.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

What is claimed as new is:

1. In combination with a conduit having pressure fluid supplying and pressure fluid transmitting portions, a safety device including an outer cylinder having an inlet chamber at one end and an outlet chamber at the other end connected to and in constant communication with the respective conduit portions, a spring seated check valve controlling communication between the inlet chamber and the first named end of said cylinder, a bypass passage providing communication between said first named end of said cylinder and said outlet chamber, a spring seated check valve controlling communication between said bypass passage and said outlet chamber, the first named valve being movable to its seat in the direction of flow of pressure fluid from the inlet chamber to the outer cylinder, the second named valve being adapted to be unseated by pressure of fluid in the by-pass passage, said cylinder being in constant communication with said outlet chamber, a second cylinder disposed centrally of the first named cylinder and opening at one end into the inlet chamber and at the other end into the outlet chamber, a piston movable on the second cylinder and within the first cylinder, a spring urging said piston toward the outlet chamber, a second piston movable in the second cylinder, and a spring urging the second piston towards the inlet chamber.

2. The structure defined in claim 1, in combination with a stop member coacting with the second piston to limit movement thereof to a point at the end of the second cylinder adjacent the inlet chamber.

3. The construction defined in claim 1, in combination with a stop member coacting with the first piston to limit movement thereof toward the oulet chamber, and means to adjust said stop member longitudinally of the cylinders.

4. The construction defined in claim 1, wherein the second cylinder is provided with ports arranged to be uncovered by the pistons when they are returned to their normal positions by said springs so as to permit passage of pressure fluid behind the first piston from the pressure fluid transmitting portion of the conduit and the second cylinder.

5. The construction defined in claim 1, in combination with a stop member coacting with the first piston to limit movement thereof toward the outlet chamber, and means to adjust said stop member longitudinally of the cylinders, to adjustably limit said movement of the first piston or to cause the latter to open the first named valve.

LLOYD T. JACKSON.

REFERENCES CITED

The following references are of record in the file of this patent:

UNITED STATES PATENTS

| Number | Name | Date |
|---|---|---|
| 1,563,143 | Bailie | Nov. 24, 1929 |
| 2,095,560 | Vickers | Oct. 12, 1937 |